United States Patent [19]

Kollar

[11] 4,026,832

[45] May 31, 1977

[54] RECOVERY OF WASTE POLYMER AND PRODUCT THEREFROM

[75] Inventor: Paul W. Kollar, Elkhart, Ind.

[73] Assignee: Mach 2 Mfg., Inc., Goshen, Ind.

[22] Filed: June 5, 1975

[21] Appl. No.: 583,894

[52] U.S. Cl. .......................... 260/2.3; 260/28.5 B; 260/79.5 C; 526/30; 526/46
[51] Int. Cl.$^2$ ........................................ C08J 11/04
[58] Field of Search .......... 260/2.3, 28.5 B, 79.5 C, 260/85.1; 526/30, 46

[56] References Cited

UNITED STATES PATENTS

| 2,477,809 | 8/1949 | Kelly | 260/2.3 |
| 2,535,931 | 12/1950 | Kelly | 260/2.3 |

*Primary Examiner*—Howard E. Schain
*Assistant Examiner*—W. C. Danison, Jr.
*Attorney, Agent, or Firm*—O'Brien & Marks

[57] ABSTRACT

The disclosure relates to a process for recovering from waste polymer from the wash down of reactors after the polymerization of styrene and butadiene to produce useful elastomeric products. The process comprises compounding the waste polymer on a two roll rubber mill with a chlorinated petroleum wax and a sulfamic acid gel (sulfamic acid is also known as a amidosulfonic acid) and compounding the same at certain selected temperatures for a period of time to produce a usable copolymeric elastomeric product.

6 Claims, No Drawings

RECOVERY OF WASTE POLYMER AND PRODUCT THEREFROM

BACKGROUND OF THE INVENTION

In the art of the production of source synthetic rubbers based on styrene-butadiene copolymerisates, high styrene content latices and the like, the polymerization occurs in an aqueous medium. Many problems are encountered during copolymerization of styrene and butadiene. Some of such materials are usually sold in the form of latices in which instance the manufacturer sells a liquid batch so the purchaser can use such material and form the desired end product therefrom, usually a synthetic rubber suitable for carpet backings and the like. Usually these synthetic rubbers sold in latex form when deposited or solidified form relatively tough, special rubber compounds that are especially prepared for, or compounded for special uses. In making the latices, lumps or masses of coagulum sometimes are formed therein and must be removed prior to sale of the latices. Such materials constitute waste and must be scrapped. yet another problem that arises in the production of both the solid synthetic rubber and in synthetic rubber latices is that solid deposits will build up on the processing equipment on the inner surfaces thereof and such deposits have to be periodically removed by wash down of the reactor. These materials are highly, overpolymerized, copolymers of styrene and butadiene and are usually considered useless in any manufacturing operations and therefor considered scrap or waste materials.

These scraps or waste materials are commonly referred to as the industry as "popcorn" and cover a wide range of molecular weights that can only be estimated on the basis of viscosity and should average out at or about 900,000 or higher.

The exact composition of the "popcorn" is also not known but probably comprises styrene-butadiene copolymer, polystyrene, polybutadiene and such popcorn usually possess a good deal of water. In any event this highly overpolymerized material has no utility and considerable quantities have been collected over the years and to date is considered useless.

Accordingly, reclamation of such normally considered waste products would be invaluable to industry not only as a means of providing a source of new and useful materials but also as a means of reducing production costs of the originally desired product.

THE INVENTION

It has now been discovered that such previously considered waste polymer product based on copolymers of styrene and butadiene are subject to reclamation to produce useful polymers having good tensile strengths and can be used as reinforcing agents and mechanical goods such as bumpers, grommets and the like.

In general, the novel process involves placing the "popcorn" on an open mill or other controlled, pressure regulated mechanical mixing device to break down the particle size of the "popcorn." A highly chlorinated paraffin wax is added while the "popcorn" still contains water and acts as a binder to hold the particles together on the mill rolls. Preferably the mill rolls are heated, good contact is provided and good conduction among the "popcorn" particles and the over polymerized material and the highly chlorinated paraffin wax heat up together under a constant pressure and mixing or kneading action.

As the temperature surpasses 212° F. the entrapped moisture (usually a water content of about 30% by weight is driven off as steam and produces a particle porosity. As the temperature continues to rise the wax of the highly chlorinated paraffin wax (melt temperature 212° F) begins to release chlorine gas which immediately assimilated into the "popcorn" mass and reacts with the styrene components of any of the styrene polymers contained in the "popcorn" polymer and initiates the molecular weight reduction of the styrene containing materials. This continues until the styrene, now depolymerized, can no longer absorb or contain the chlorine and it therefore begins to be driven off as a gas. While some residual chlorine remains it is of but little concern. After about 90% of the water contained in the "popcorn" has been driven off the sulfamic acid gel is added to the mixture being kneaded on the mill and as further moisture is driven off the reaction between the sulfamic acid in gel form and the butadiene component of the mass is accellerated.

The addition of the sulfamic acid gel as a peptizer for the polybutadiene in the polymer, while working on the mill at approximately 260° F to 300° F, the softening action reduces the butadiene portion of the polymeric mass to a workable and recoverable consistency.

After working the "popcorn" mixture of the mill at the above prescribed temperatures it was found that a lower molecular weight copolymer comprising styrene and butadiene could be formed comprising approximately 55% styrene and 45% butadiene.

The chlorinated paraffin wax suitable for use in the process of the invention includes highly chlorinated paraffin waxes containing from 65% – 75% of chemically combined chlorine. Preferred is a chlorinated paraffin wax having a 70% chlorine content and known in the trade as Chlorowax.

The amount of chlorinated paraffin wax employed in the process of the invention is not necessarily a critical feature of the invention and can generally be employed in amounts of from 2.5% by weight to 10.0% by weight of the chlorinated paraffin wax hydrocarbon based on the weight of the starting material "popcorn".

Likewise the amount of sulfamic acid gel can be varied over the range of from 0.1% by weight to 5.0% by weight of the sulfamic acid gel based on the weight of the starting material "popcorn".

The temperature of the milling procedure is also not necessarily a critical feature of the invention. Since the starting material "popcorn" usually contains water of the order of 30% by weight, the lower operating temperature is of the order of 212° F. In general, temperatures in the range of from 212° F to about 340° F and preferably from about 212° F to about 290° F are sufficient to produce a useable stabilized butadiene styrene copolymeric product.

The upper limit of temperature is governed by the manner in which the "popcorn" is broken down in to its components, butadiene and styrene and begin repolymerizing. This usually occurs at temperatures of about 260° F and continues to temperatures of about 290° F to 300° F. Caution should be observed to avoid a reversion to a "popcorn" type material again. For these reasons temperatures of more than 320° F–340° F are not recommended. Preferred temperatures are in the range of from about 212° F–320° F.

The following example will serve to illustrate the practice of the invention.

EXAMPLE 1

The over-polymerized material containing water is loaded on a rubber maintained at 300° F and 4.0% by weight of Chlorowax, based on the weight of the starting material immediately added thereto. With the heat of the mill steam and pressure from the working and kneading action of the mill chlorine is released into the "popcorn" polymer exerting a solvating action thereon. The chlorine gas is assimilated into starting material and begins to breakdown the polystyrene and generate styrene. Action is continued until chlorine gas begins to evolve and be driven off. Gelled sulfamic acid in an amount of 0.5% by weight of the starting material is added to the reaction mass after about 90% by weight of the contained water is driven off. The gelled sulfamic acid is assimilated into the reaction mass and attacks the over-polymerized butadiene portion of the molecules and generates butadiene. As the temperatures approach 260° F within the kneaded mass the regenerated butadiene and styrene begin repolymerization. The repolymerization continues to a temperature of about 290° F to about 300° F at which time the material should be removed from the mill and cooled.

There is produced a lower molecular weight copolymer of styrene and butadiene containing approximately 55.0% styrene and 45% butadiene.

From the above illustrated Example, it is manifest that the invention is capable of many variations and permutations all of which are considered within the scope of the appended claims.

What is claimed is:

1. A process for treating waste of scrap polymer material composed of over-polymerized styrene and butadiene and containing substantial amounts of water therein to soften and render reusable such polymer material comprising the steps of:
   a. loading polymer material onto a heated mill;
   b. adding highly chlorinated hydrocarbon wax to said polymer of step (a), said wax containing approximately 65%–75% chemically combined chlorine;
   c. releasing entrapped moisture from the polymer and thereafter adding gelled sulfamic acid to the polymer material;
   d. the amount of highly chlorinated hydrocarbon wax being in the range of from 2.5%–10.0% by weight based on the weight of the polymer material and the amount of gelled sulfamic acid being in the range of from 0.1%–5.0% by weight based on the weight of the polymer material;
   e. kneading said polymer material, highly chlorinated hydrocarbon wax, and gelled sulfamic acid of step (d) at an elevated temperature for a period of time sufficient to produce a lower molecular weight copolymer of styrene and butadiene containing approximately 55.0% styrene and 45.0% butadiene and
   f. recovering the product of said mill.

2. The process of claim 1 wherein the highly chlorinated hydrocarbon wax contains approximately 70% chemically combined chlorine.

3. The process of claim 1, wherein the kneading is carried out at temperatures in the range of from 212° F to 340° F.

4. The process of claim 1 wherein the amount of highly chlorinated hydrocarbon wax is 4.0% by weight and the amount of gelled sulfamic acid is 0.5% by weight based on the weight of the polymer material.

5. The process according to claim 4 wherein the higly chlorinated hydrocarbon wax contains approximately 70% chlorine.

6. The product prepared by the process of claim 1.

* * * * *